(12) United States Patent
Joo et al.

(10) Patent No.: US 11,769,928 B2
(45) Date of Patent: Sep. 26, 2023

(54) CERAMIC NANOFIBER SEPARATORS

(71) Applicant: CORNELL UNIVERSITY, Ithaca, NY (US)

(72) Inventors: Yong Lak Joo, Ithaca, NY (US); Daehwan Cho, Austin, TX (US); Yong Seok Kim, Ithaca, NY (US)

(73) Assignee: Cornell University, Ithaca, NY (US)

( * ) Notice: Subject to any disclaimer, the term of this patent is extended or adjusted under 35 U.S.C. 154(b) by 81 days.

(21) Appl. No.: 17/316,035

(22) Filed: May 10, 2021

(65) Prior Publication Data
US 2021/0273294 A1    Sep. 2, 2021

Related U.S. Application Data

(63) Continuation of application No. 16/220,874, filed on Dec. 14, 2018, now Pat. No. 11,038,240, which is a continuation of application No. 14/437,916, filed as application No. PCT/US2013/066056 on Oct. 22, 2013, now abandoned.

(60) Provisional application No. 61/717,260, filed on Oct. 23, 2012.

(51) Int. Cl.
| | |
|---|---|
| *H01M 50/44* | (2021.01) |
| *H01M 50/431* | (2021.01) |
| *H01M 50/446* | (2021.01) |
| *H01M 10/0525* | (2010.01) |
| *H01M 50/489* | (2021.01) |
| *H01M 50/491* | (2021.01) |
| *H01M 50/434* | (2021.01) |
| *H01M 50/403* | (2021.01) |

(52) U.S. Cl.
CPC ....... *H01M 50/44* (2021.01); *H01M 10/0525* (2013.01); *H01M 50/434* (2021.01); *H01M 50/446* (2021.01); *H01M 50/489* (2021.01); *H01M 50/491* (2021.01); *H01M 50/403* (2021.01); *Y02E 60/10* (2013.01); *Y02T 10/70* (2013.01)

(58) Field of Classification Search
CPC .......... H01M 10/0525; H01M 50/403; H01M 50/431; H01M 50/434; H01M 50/44; H01M 50/446; H01M 50/489; H01M 50/491; Y02E 60/10; Y02T 10/70
See application file for complete search history.

(56) References Cited

U.S. PATENT DOCUMENTS

| | | | | |
|---|---|---|---|---|
| 2007/0269655 | A1* | 11/2007 | Joo | C30B 5/00 423/608 |
| 2010/0297443 | A1* | 11/2010 | Kamisasa | D04H 3/005 428/374 |
| 2012/0082884 | A1* | 4/2012 | Orilall | D01D 5/0084 977/762 |

* cited by examiner

*Primary Examiner* — Lingwen R Zeng
(74) *Attorney, Agent, or Firm* — Barnes & Thornburg LLP

(57) ABSTRACT

Provided herein are ceramic nanofibers and processes for preparing the same. In specific examples, provided herein are ceramic nanofiber mats for use as separators in batteries, particularly lithium ion batteries. In some embodiments, the separators described herein may include a nanofiber mat including at least one nanofiber having a continuous matrix material.

20 Claims, 6 Drawing Sheets

CERAMIC NANOFIBER SEPARATORS

CROSS-REFERENCE

This application is a continuation of U.S. Non-Provisional application Ser. No. 14/437,916, filed Apr. 23, 2015, which was a U.S. National Phase Application of International Application PCT/US2013/066056, filed on Oct. 22, 2013, which claims the benefit of U.S. Provisional Application No. 61/717,260, filed Oct. 23, 2012, each of which is incorporated herein by reference in its entirety.

BACKGROUND OF THE INVENTION

Batteries comprise one or more electrochemical cell, such cells generally comprising a cathode, an anode and an electrolyte. Lithium ion batteries are high energy density batteries that are fairly commonly used in consumer electronics and electric vehicles. In lithium ion batteries, lithium ions generally move from the negative electrode to the positive electrode during discharge and vice versa when charging. In the as-fabricated and discharged state, lithium ion batteries often comprise a lithium alloy (such as a lithium metal oxide) at the cathode (positive electrode) and another material, generally carbon, at the anode (negative electrode). Separators are generally porous, film-like materials made of electrically insulating polymer olefins (such as polypropylene (PP) or polyethylene (PE)).

SUMMARY OF THE INVENTION

Provided herein are ceramic-containing nanofibers, processes of using such nanofibers, and processes of manufacturing such nanofibers. In specific embodiments, provided herein are separators comprising nanofibers, such nanofibers comprising ceramic materials. For example, provided in certain embodiments herein is a nanofiber or a separator comprising a nanofiber (e.g., one or more nanofiber in the form of a nanofiber mat), the nanofiber comprising a continuous ceramic matrix. In certain embodiments, the ceramic matrix comprises at least two different of materials, e.g., a first and second ceramic material. In some embodiments, the first and second ceramic materials form a first and second continuous matrix, or, collectively, form an integrated matrix. In some embodiments, the nanofiber further comprises a continuous polymer matrix. In certain embodiments, the continuous ceramic matrix is an integrated matrix comprising ceramic and polymer.

In some instances, separators require porosity to allow flow of ions between a cathode chamber and an anode chamber of a battery (e.g., lithium cations in a lithium ion battery). However, it is also important to consider the ability of the separators to minimize and prevent runaway reactions (e.g., resulting from ruptured membranes). Generally, ceramic materials have improved thermal stability compared to polyolefin materials (such as polyethylene and polypropylene) typically used in battery separators, and nanofiber mats described herein generally provide sufficient porosity for lithium ions to pass through.

Provided in certain embodiments herein is a battery separator comprising a nanofiber mat, the nanofiber mat comprising at least one nanofiber, the at least one nanofiber comprising at least one ceramic material, or, more specifically, at least two ceramic materials.

In specific embodiments, the nanofiber(s) comprises a continuous matrix of a ceramic material. In certain embodiments, the nanofiber(s) comprise coaxially layered materials (e.g., two coaxially layered ceramic materials). In specific embodiments, the nanofiber(s) comprise a first ceramic material as a core material and a second ceramic material as a sheath material, the sheath material at least partially surrounding the core material. In various embodiments, each of the ceramic materials is independently selected from the group consisting of silica, alumina, zirconia, beryllia, ceria, titania, barium titanate, and strontium titanate.

In some embodiments, the nanofiber(s) provided herein is mesoporous. In certain embodiments, the porosity of the nanofiber mat is at least 10%. In specific embodiments, the porosity of the nanofiber mat is at least 20%. In more specific embodiments, the porosity of the nanofiber mat is at least 30%. In still more specific embodiments, the porosity of the nanofiber mat is at least 50%. In yet more specific embodiments, the porosity of the nanofiber mat is at least 80%.

In certain embodiments, a battery separator or nanofiber mat provided herein comprises non-aggregated, discrete domains of ceramic material. In specific embodiments, the nanofibers do not comprise a concentration of domains 20 times higher along a 500 nm long segment along the length of the nanofiber than an adjacent 500 nm length of the nanofiber.

In some embodiments, the nanofiber(s) comprises at least 10% (e.g., at least 30%) by weight of ceramic material (e.g., on average). In specific embodiments, the nanofiber(s) comprises at least 50% by weight of ceramic material (e.g., on average). In more specific embodiments, the nanofiber(s) comprises at least 70% by weight of ceramic material (e.g., on average). In still more embodiments, the nanofiber(s) comprises at least 90% by weight of ceramic material (e.g., on average). In yet more embodiments, the nanofiber(s) comprises at least 90% by weight of ceramic material (e.g., on average). In certain embodiments, the nanofiber(s) comprises less than 50% by weight organic material (e.g., on average). In specific embodiments, the nanofiber(s) comprises less than 30% by weight organic material (e.g., on average). In more specific embodiments, the nanofiber(s) comprises less than 10% by weight organic material (e.g., on average). In still more specific embodiments, the nanofiber(s) comprises less than 5% by weight organic material (e.g., on average). In certain embodiments, the nanofibers comprise at least 50% by elemental weight metal and oxygen. In specific embodiments, the nanofibers comprise at least 60% by elemental weight metal and oxygen. In more specific embodiments, the nanofibers comprise at least 75% by elemental weight metal and oxygen. In still more specific embodiments, the nanofibers comprise at least 90% by elemental weight metal and oxygen.

In certain embodiments, the nanofiber(s) has an average diameter of less than 1 micron (e.g., less than 800 nm). In some embodiments, the nanofiber(s) has an average aspect ratio of at least 100 (e.g., at least 1000 or at least 10,000).

Also, provided herein are batteries (e.g., lithium ion batteries) comprising any nanofiber described herein, or a separator comprising any of the nanofibers described herein.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 4 (panel B) illustrates rate performance over many cycles. Polymer-Ceramic NF Separators exhibit higher capacity and much better stability over cycles than a commercial polyethylene (PE) separator.

DETAILED DESCRIPTION OF THE INVENTION

Provided herein are ceramic containing nanofibers and nanofiber mats and processes for preparing ceramic containing nanofibers, nanocomposite nanofibers and nanofiber mats. In some embodiments, a nanofiber (e.g., of a plurality of nanofibers, of a nanofiber mat, or of a process described herein) comprises a ceramic material. In some embodiments, the ceramic material forms a continuous matrix within the nanofiber. In some embodiments, the nanofiber comprises a ceramic material forming a continuous matrix within the fiber and a second material, e.g., a second ceramic forming a continuous matrix within the nanofiber. In other specific embodiments, the ceramic material forms a plurality of discrete domains within the nanofiber. In more specific embodiments, the nanofiber comprises a ceramic material, forming a plurality of discrete domains within the nanofiber, and a second material, such as a second ceramic material, that forms a continuous matrix within the nanofiber (e.g., provides the continuous structure of the nanofiber). In some embodiments, the nanofiber comprises a ceramic material and a polymer material. In specific embodiments, the ceramic material and the polymer material both form continuous matrices within the nanofiber. In certain embodiments, the ceramic material forms a continuous core matrix and the polymer material forms a continuous shell material. In certain embodiments, (e.g., provided by electrospinning a low temperature curing ceramic precursor with a polymer and subsequent curing of the ceramic precursor) the ceramic and polymer materials form an integrated matrix.

In some embodiments, nanofibers provide herein are coaxially layered nanofibers, the nanofibers comprising a core and a sheath that at least partially surrounds the core. In some embodiments, the sheath runs along the entire length of the nanofiber. In other embodiments, the sheath runs along at least a portion of the nanofiber. In certain embodiments, the core comprises a first material (e.g., a first ceramic material) and the sheath comprises a second material (e.g., a second ceramic material). In specific embodiments, the first ceramic material is different from the second ceramic material. In other embodiments, one of the sheath or core materials is a ceramic and the other is not.

Figure 1:
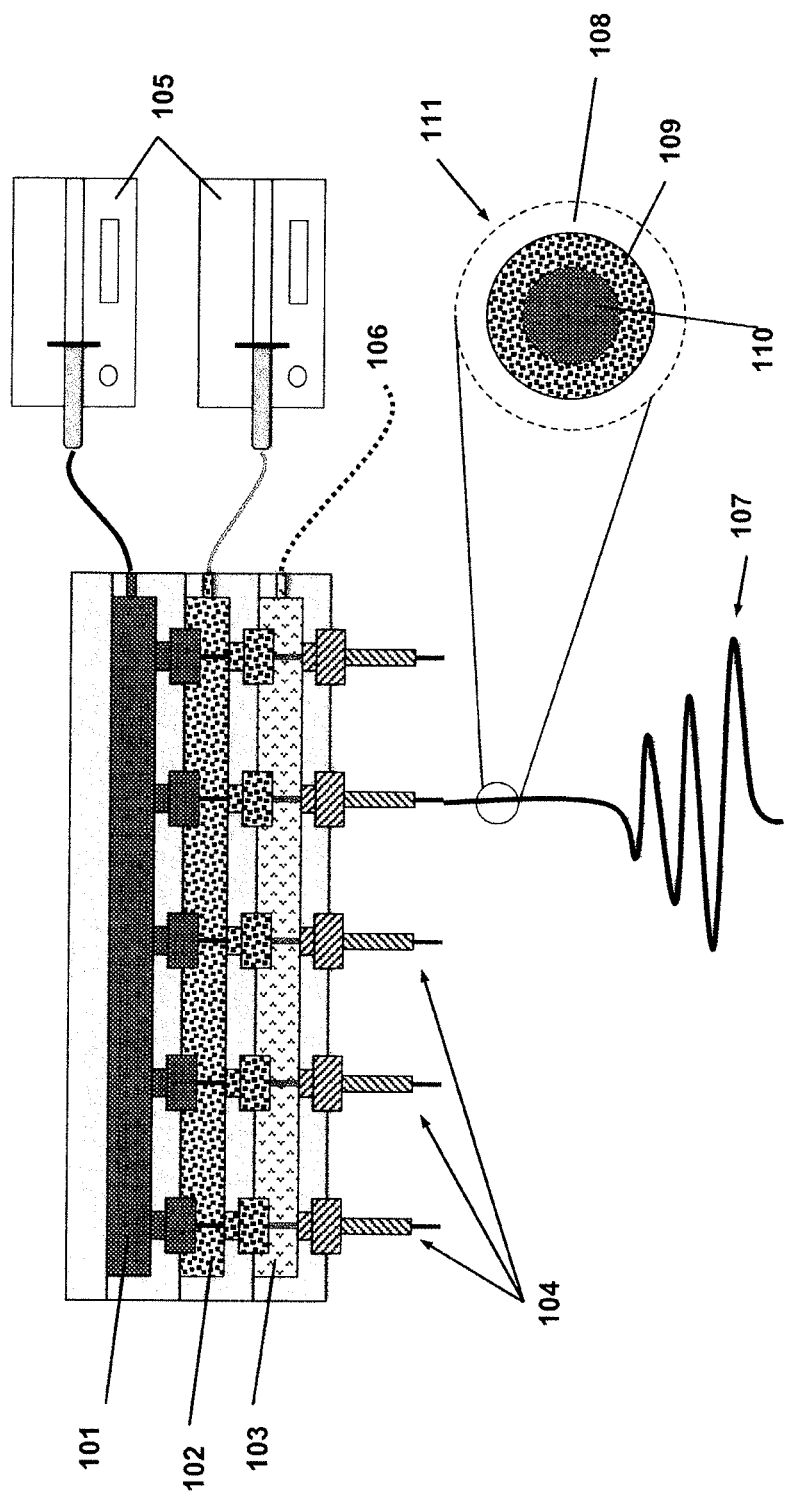
FIG. 1 illustrates a multiaxial electrospinning (multiple fluids about a substantially common axis) system for preparing a coaxially layered nanocomposite nanofiber, and a coaxially layered nanocomposite nanofiber.

FIG. 1 illustrates a nanofiber provided herein comprising a first and a second continuous matrix material, wherein the first and second continuous matrix materials are coaxially layered. In specific embodiments, the first material forms the core 110 of the coaxially layered nanofiber 107 (illustrated in the cross sectional view 111) and the second material forms a layer 109 at least partially surrounding the core 110. In other specific embodiments, the second material forms the core 110 of the coaxially layered nanofiber 107 (illustrated in the cross sectional view 111) and the first material forms a layer 109 at least partially surrounding the core 110. In some instances, the nanofibers are prepared by coaxially electrospinning the two layers with a third coaxial layer 108. In some embodiments, the third coaxial layer 108 comprises a third matrix material. In other embodiments, the third coaxial layer 108 comprises air, e.g., for gas assisting the electrospinning process. Moreover, in some embodiments, the core 110 is optionally hollow, with one or both of the outer layers 109 and/or 108 comprising a ceramic material. In some embodiments, provided herein is a ceramic containing nanofiber (e.g., a treated nanofiber 107 having at least two layers, such as illustrated by the cross sectional view 111). In some embodiments, the core layer 110 is a ceramic, the sheath layer 109 is polymer (e.g., formed by depositing polymer on a ceramic nanofiber), and the outer layer 108 is absent. In certain embodiments, the core layer 110 comprises a first material (e.g., a ceramic), the intermediate layer 109 comprises a second material—a ceramic, and the outer layer 108 comprises a polymer. FIG. 1 also illustrates an exemplary system or schematic of a process described herein, particularly a system or process for preparing a coaxially layered nanocomposite nanofiber (e.g., by a coaxial gas assisted electrospinning process). In some instances, a first fluid stock 101 (e.g., comprising a ceramic precursor and a polymer) is electrospun with a second fluid stock 102 (e.g., comprising a second ceramic precursor and a second polymer, the second precursor and polymer independently being either the same or different from the first), and a third fluid (e.g., gas or third fluid stock) 103. The fluid stocks may be provided to an electrospinning apparatus by any device, e.g., by a syringe 105. And a gas may be provided from any source 106 (e.g., air pump). In some embodiments such a system comprises a plurality of co-axial needles 104. Similarly, 111 is representative of an exemplary cross section of coaxial needles/spinnerets. For example, exemplary co-axial needles comprise an outer sheath tube (which would be represented by 108) at least one intermediate tube (which is optionally absent, which would be represented by 109), and a core tube (which would be represented by 110). In specific embodiments, such tubes are aligned along a common axis (e.g., aligned within 5 degrees of one another). In some instances, the tubes are slightly offset, but the angle of the tubes is substantially aligned (e.g., within 5 degrees of one another).

In certain embodiments, continuous matrix materials of any nanofiber described herein is continuous over at least a portion of the length of the nanofiber. In some embodiments, the continuous matrix material runs along at least 10% the length of the nanofiber (e.g., on average for a plurality of nanofibers). In more specific embodiments, the continuous matrix material runs along at least 25% the length of the nanofiber (e.g., on average for a plurality of nanofibers). In still more specific embodiments, the continuous matrix runs along at least 50% the length of the nanofiber (e.g., on average for a plurality of nanofibers). In yet more specific embodiments, the continuous matrix runs along at least 75% the length of the nanofiber (e.g., on average for a plurality of nanofibers). In some embodiments, the continuous matrix is found along at least 50%, at least 60%, at least 70%, at least 80%, at least 90%, at least 95%, at least 98%, or at least 99% the length of the nanofiber (e.g., on average for a plurality of nanofibers). In some embodiments, the continuous matrix material runs along at least 1 micron of the length of the nanofiber (e.g., on average for a plurality of nanofibers). In more specific embodiments, the continuous matrix material runs along at least 10 microns of the length of the nanofiber (e.g., on average for a plurality of nanofibers). In still more specific embodiments, the continuous matrix runs along at least 100 microns of the length of the nanofiber (e.g., on average for a plurality of nanofibers). In yet more specific embodiments, the continuous matrix runs along at least 1 mm of the length of the nanofiber (e.g., on average for a plurality of nanofibers).

In some embodiments, a nanofiber provide herein comprises discrete domains within the nanocomposite nanofiber. In specific embodiments, the discrete domains comprise a ceramic material. In certain embodiments, the discrete domains are non-aggregated. In some embodiments, the non-aggregated domains are dispersed, e.g., in a substantially uniform manner, along the length of the nanofiber. In certain embodiments, the nanocomposite nanofibers provided herein do not comprise a concentration of domains in one segment (e.g., a 500 nm, 1 micron, 1.5 micron, 2 micron) segment that is over 10 times (e.g., 20 times, 30 times, 50 times, or the like) as concentrated as an immediately adjacent segment. In some embodiments, the segment size for such measurements is a defined length (e.g., 500 nm, 1 micron, 1.5 micron, 2 micron). In other embodiments, the segment size is a function of the average domain (e.g., particle) size (e.g., the segment 5 times, 10 times, 20 times, 100 times the average domain size). In some embodiments, the domains have a (average) size 1 nm to 1000 nm, 1 nm to 500 nm, 1 nm to 200 nm, 1 nm to 100 nm, 20 nm to 30 nm, 1 nm to 20 nm, 30 nm to 90 nm, 40 nm to 70 nm, 15 nm to 40 nm, or the like.

Ceramic Material

In various embodiments, the ceramic material in a nanofiber or nanocomposite nanofiber provided herein is any suitable ceramic material. In some embodiments, the ceramic material is an alloy (e.g., a metal oxide that comprises one or more metal), or a ceramic precursor (e.g., aluminum acetate or silicon acetate). In certain embodiments, the ceramic material is a material from a ceramic precursor curable at low temperature (e.g., room temperature) (e.g. perhydropolysilazane). In specific embodiments, the low temperature curing ceramic precursor is a polysilazane, e.g., represented by the formula —[$R^1R^2SiNR^3$]$_n$—, wherein each of $R^1$, $R^2$, and $R^3$ are independently selected from H and alkyl (e.g., $C_1$-$C_6$ alkyl—i.e., a carbon having 1-6 carbon atoms, or $C_1$-$C_3$ alkyl), and n is an integer, such as an integer greater than 10 (e.g., on average), or greater than 100 (e.g., on average). In some embodiments, n is 10-10,000, or 10-1000. In specific embodiments, $R^3$ is H. In more specific embodiments, each of $R^1$, $R^2$, and $R^3$ is H. In certain embodiments, the ceramic material is a material suitable for use in a lithium ion battery separator. In some embodiments, the ceramic material is a precursor material capable of being converted into a material suitable for use in a lithium ion battery separator (e.g., a ceramic precursor). In some embodiments, the ceramic material is a metal oxide comprising at least one metal (e.g., silicon and/or aluminum).

In certain embodiments, provided herein are nanofibers comprising one or more ceramic material. In some embodiments, the nanofibers comprise at least 3% by weight of the ceramic material. In specific embodiments, the nanofibers comprise at least 9% by weight of the ceramic material. In more specific embodiments, the nanofibers comprise at least 25% by weight of the ceramic material (e.g., on average for a plurality of nanofibers). In more specific embodiments, the nanofibers comprise at least 50% by weight of the ceramic material (e.g., on average for a plurality of nanofibers). In still more specific embodiments, the nanofibers comprise at least 75% by weight of the ceramic material (e.g., on average for a plurality of nanofibers). In yet more specific embodiments, the nanofibers comprise at least 90% by weight of the ceramic material (e.g., on average for a plurality of nanofibers). In specific embodiments, the nanofibers comprise at least 95% by weight of the ceramic material (e.g., on average for a plurality of nanofibers).

Any suitable ceramic material is optionally utilized. Preferably, such ceramic materials are inert—or substantially inert—in a battery (e.g., lithium ion battery) environment (e.g., under normal and runaway conditions). In some embodiments, the ceramic material(s) comprises silica, alumina, zirconia, beryllia, ceria, titania, barium titanate, strontium titanate, or the like, or combinations thereof.

Second Material

In some embodiments, a nanocomposite nanofiber provided herein comprises a ceramic material (or a ceramic precursor) and a second material. In certain embodiments, additional materials are optionally present. In some embodiments, the second material is a continuous matrix material, as described herein. In certain embodiments, the second material is a second ceramic or a polymer (e.g., when the ceramic material is a ceramic precursor).

In some embodiments, provided herein is a nanocomposite nanofiber comprising a first material and a second material. In certain embodiments, provided herein is a nanocomposite ceramic nanofiber comprising a first ceramic material and a second material (e.g., a ceramic material or a polymer material). In certain embodiments, provided herein is a nanocomposite ceramic nanofiber comprising a first ceramic material and a second ceramic material. In some embodiments, the first material is a first continuous ceramic matrix material. In specific embodiments, the first (ceramic) material is a first continuous matrix material and the second (e.g., ceramic) material is a second continuous matrix material. In more specific embodiments, the first (ceramic) material forms the core of a coaxially layered nanocomposite nanofiber and the second (e.g., ceramic) material forms the sheath at least partially surrounding the core. In certain embodiments, such nanocomposite nanofibers optionally comprise an additional matrix material between the ceramic containing core and ceramic containing sheath, and/or an additional (e.g., matrix) material on the surface of the ceramic containing sheath (e.g., at least partially surrounding the ceramic containing sheath). In some embodiments, when the nanofiber comprises a polymer material as a second material, the polymer is optionally deposited on the nanofiber, e.g., by dissolving the polymer in a solution and exposing a ceramic nanofiber to the solution—e.g., followed by evaporation of solvent.

In some embodiments, a nanocomposite nanofiber provided herein comprises a first material and a second material, the first and second materials forming an integrated matrix (e.g., the materials are in the same layer and are well dispersed along the length of the nanofiber—in some instances one or both of the integrated materials individually form a continuous matrix in the nanofiber). In some embodiments, the first material is a ceramic and the second material is a ceramic. In other embodiments, the first material is a ceramic and the second material is a polymer. In specific embodiments, the first material is silica and the second material is a polymer (e.g., PEO).

In some embodiments, a nanocomposite nanofiber provided herein comprises a first material and a second material, the first material comprising a polymer and forming a continuous matrix and the second material comprising a ceramic precursor (e.g., a metal salt, such as silicon acetate, zirconium acetate, or a low temperature curing ceramic precursor, such as perhydropolysilazane). In specific embodiments, the ceramic precursor is a silica precursor (e.g., a low temperature curing ceramic precursor, such as a polysilazane—e.g., perhydropolysilazane).

In certain embodiments, the polymer material is or comprises polyisoprene (PI), a polylactic acid (PLA), a polyvinyl alcohol (PVA), a polyethylene oxide (PEO), a polyvinylpyrrolidone (PVP), polyacrylamide (PAA), polyacrylonitrile (PAN), or any combination thereof.

Polymer Material

In some embodiments, a polymer in a process, fluid stock or nanofiber described herein is an organic polymer. In some embodiments, polymers used in the compositions and processes described herein are hydrophilic polymers, including water-soluble and water swellable polymers. In some aspects, the polymer is soluble in water, meaning that it forms a solution in water. In other embodiments, the polymer is swellable in water, meaning that upon addition of water to the polymer the polymer increases its volume up to a limit. Exemplary polymers suitable for the present methods and compositions include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, aramid, and the like. In some embodiments, the polymer is isolated from biological material. In some embodiments, the polymer is starch, chitosan, xanthan, agar, guar gum, and the like. In other instances, other polymers, such as polyacrylonitrile ("PAN") are optionally utilized (e.g., with DMF as a solvent in electrospinning or other processes). In other instances, a polyacrylate (e.g., polyalkacrylate, polyacrylic acid, polyalkylalkacrylate, such as poly(methyl methacrylate) (PMMA), or the like), or polycarbonate is optionally utilized. In some instances, the polymer is polyacrylonitrile (PAN), polyvinyl alcohol (PVA), a polyethylene oxide (PEO), polyvinylpyridine, polyisoprene (PI), polyimide, polylactic acid (PLA), a polyalkylene oxide, polypropylene oxide (PPO), polystyrene (PS), a polyarylvinyl, a polyheteroarylvinyl, a nylon, a polyacrylate (e.g., poly acrylic acid, polyalkylalkacrylate—such as polymethylmethacrylate (PMMA), polyalkylacrylate, polyalkacrylate), polyacrylamide, polyvinylpyrrolidone (PVP) block, polyacrylonitrile (PAN), polyglycolic acid, hydroxyethylcellulose (HEC), ethylcellulose, cellulose ethers, polyacrylic acid, polyisocyanate, or a combination thereof.

In certain embodiments, a polymer provided herein has any suitable molecular weight, e.g., at least 50,000 g/mol, at least 100,000 g/mol, at least 500,000 g/mol or the like. In some embodiments, the molecular weight is 50,000 to 1,000,000 g/mol.

Nanofibers

In certain embodiments, nanofiber provided herein have any suitable characteristic.

In some embodiments, a nanofiber provided herein has a diameter of less than 2 microns (e.g., an average diameter of a plurality of nanofibers). In specific embodiments, a nanofiber provided herein has a diameter of less than 1.5 microns (e.g., an average diameter of a plurality of nanofibers). In more specific embodiments, a nanofiber provided herein has a diameter of less than 1 micron (e.g., an average diameter of a plurality of nanofibers). In still more specific embodiments, a nanofiber provided herein has a diameter of less than 850 nm (e.g., an average diameter of a plurality of nanofibers). In yet more specific embodiments, a nanofiber provided herein has a diameter of less than 750 nm (e.g., an average diameter of a plurality of nanofibers). In more specific embodiments, a nanofiber provided herein has a diameter of less than 600 nm (e.g., an average diameter of a plurality of nanofibers). In some embodiments, a nanofiber provided herein has a diameter of at least 50 nm. In specific embodiments, a nanofiber provided herein has a diameter of at least 100 nm. In still more specific embodiments, a nanofiber provided herein has a diameter of at least 200 nm.

In some embodiments, nanofibers provided herein have a (e.g., average) length of at least 1 µm, at least 10 µm, at least 20 µm, at least 100 µm, at least 500 µm, at least 1,000 µm, at least 5,000 µm, at least 10,000 µm, or the like. In specific embodiments, nanofibers provided herein have a (e.g., average) length of at least 1 mm.

In some embodiments, a nanofiber provided herein has an aspect ratio of greater than 10 (e.g., an average aspect ratio of a plurality of nanofibers). In specific embodiments, a nanofiber provided herein has an aspect ratio of greater than 100 (e.g., an average aspect ratio of a plurality of nanofibers). In more specific embodiments, a nanofiber provided herein has an aspect ratio of greater than 500 (e.g., an average aspect ratio of a plurality of nanofibers). In still more specific embodiments, a nanofiber provided herein has an aspect ratio of greater than 1000 (e.g., an average aspect ratio of a plurality of nanofibers). In yet more specific embodiments, a nanofiber provided herein has an aspect ratio of greater than $10^4$ (e.g., an average aspect ratio of a plurality of nanofibers).

In some embodiments, nanofibers provided herein comprise (e.g., on average) at least 99%, at least 98%, at least 97%, at least 96%, at least 95%, at least 90%, at least 80%, or the like of metal and oxygen, when taken together, by mass (e.g., elemental mass). In some embodiments, nanofibers provided herein comprise (e.g., on average) at least 99%, at least 98%, at least 97%, at least 96%, at least 95%, at least 90%, at least 80%, or the like of metal, carbon and oxygen, when taken together, by mass (e.g., elemental mass).

In some embodiments, the porosity of a nanofiber mat (comprising one or more nanofiber described herein) is at least 5%, at least 10%, at least 15%, at least 20%, at least 25%, at least 50%, or the like. Porosity can be measured in any suitable manner. For example, in some instances, the porosity of a nanofiber mat is determined by measuring the fluid volume present in the nanofiber mat after the nanofiber mat is submerged in or filled with a fluid.

Described herein are nanofibers and methods for making nanofibers that have a plurality of pores. The pores may be of any suitable size or shape. In some embodiments the pores are "mesopores", having a diameter of less than 100 nm (e.g., between 2 and 50 nm, on average). In some embodiments, the pores are "ordered", such as having a substantially uniform shape, a substantially uniform size and/or are distributed substantially uniformly through the nanofiber. In some embodiments, nanofibers described herein have a high surface area and/or specific surface area (e.g., surface area per mass of nanofiber and/or surface area per volume of nanofiber). In some embodiments, nanofibers described herein comprise ordered pores, e.g., providing substantially flexible and/or non-brittleness.

In one aspect, described herein are nanofibers comprising any one or more of: (a) a surface area of at least $10 \pi r h$, wherein r is the radius of the nanofiber and h is the length of the nanofiber; (b) a specific surface area of at least 100 $m^2/g$; (c) a porosity of at least 20% and a length of at least 1 μm; (d) a porosity of at least 35%, wherein the nanofiber is substantially contiguous; (e) a porosity of at least 35%, wherein the nanofiber is substantially flexible or non-brittle; (f) a plurality of pores with an average diameter of at least 1 nm; (g) a plurality of pores, wherein the pores have a substantially uniform shape; (h) a plurality of pores, wherein the pores have a substantially uniform size; and (i) a plurality of pores, wherein the pores are distributed substantially uniformly throughout the nanofiber.

In some embodiments, the pores comprise spheres, cylinders, layers, channels, or any combination thereof. In some embodiments, the pores are helical. In some embodiments, the nanofiber comprises metal, metal alloy, ceramic, polymer, or any combination thereof.

In one aspect, described herein is a method for producing an ordered mesoporous nanofiber, the method comprising: (a) coaxially electrospinning a first fluid stock with a second fluid stock to produce a first nanofiber, the first fluid stock comprising at least one block co-polymer and a ceramic component (e.g., ceramic precursor), the second fluid stock comprising a coating agent, and the first nanofiber comprising a first layer (e.g., core) and a second layer (e.g., coat) that at least partially coats the first layer; (b) annealing the first nanofiber; (c) optionally removing the second layer from the first nanofiber to produce a second nanofiber comprising the block co-polymer; and (d) selectively removing at least part of the block co-polymer from the first nanofiber or the second nanofiber (e.g. thereby producing an ordered mesoporous nanofiber). Additional coaxial layers are optional—e.g., comprising a precursor and block copolymer for an additional mesoporous layer, or a precursor and a polymer as described herein for a non-mesoporous layer.

In some embodiments, the block co-polymer comprises a polyisoprene (PI) block, a polylactic acid (PLA) block, a polyvinyl alcohol (PVA) block, a polyethylene oxide (PEO) block, a polyvinylpyrrolidone (PVP) block, polyacrylamide (PAA) block or any combination thereof (i.e., thermally or chemically degradable polymers).

In some embodiments, the block co-polymer further comprises a block that does not degrade under conditions suitable for degrading and/or removing the degradable and/or removable block.

In some embodiments, the block co-polymer comprises a polystyrene (PS) block, a poly(methyl methacrylate) (PMMA) block, a polyacrylonitrile (PAN) block, or any combination thereof (i.e., thermally or chemically stable polymers).

In some embodiments, the coating layer and at least part of the block co-polymer (concurrently or sequentially) is selectively removed in any suitable manner, such as, by heating, by ozonolysis, by treating with an acid, by treating with a base, by treating with water, by combined assembly by soft and hard (CASH) chemistries, or any combination thereof.

Additionally, U.S. Application Ser. No. 61/599,541 is incorporated herein by reference for disclosures related to such techniques.

Batteries and Separators

In some embodiments, provided herein is a battery (e.g., a primary or secondary cell) comprising at least one nanofiber described herein. In specific instances, the battery comprises plurality of such nanofibers, e.g., a non-woven mat thereof. In some embodiments, the battery comprises at least two electrodes (e.g., an anode and a cathode) and a separator, the separator comprising at least one nanofiber described herein. In specific embodiments, the battery is a lithium-ion battery and the separator comprises at least one nanofiber described herein (e.g., a nanofiber mat thereof). Likewise, provided herein is a battery separator comprising any nanocomposite nanofiber described herein (e.g., a nanofiber mat comprising one or more such nanofibers).

In certain embodiments, separator nanofibers (e.g., mat thereof) are compressed—at any suitable pressure for any suitable amount of time. In some embodiments, a process described herein comprises compressing the nanofibers (e.g., electrospinning or assembling a non-woven mat of nanofibers and subsequently compressing the non-woven mat). In some embodiments, the nanofibers are compressed at a pressure of 0.1 Mpa to 10 Mpa. In some embodiments, the nanofibers are compressed at a pressure of 1 Mpa to 5 Mpa.

In further or alternative embodiments, the separator has any suitable thickness, such as a thickness of 10-500 micron. In some embodiments, the separator has a thickness of 10-200 micron. In specific embodiments, the separator has a thickness of 15-100 micron.

Figure 4:
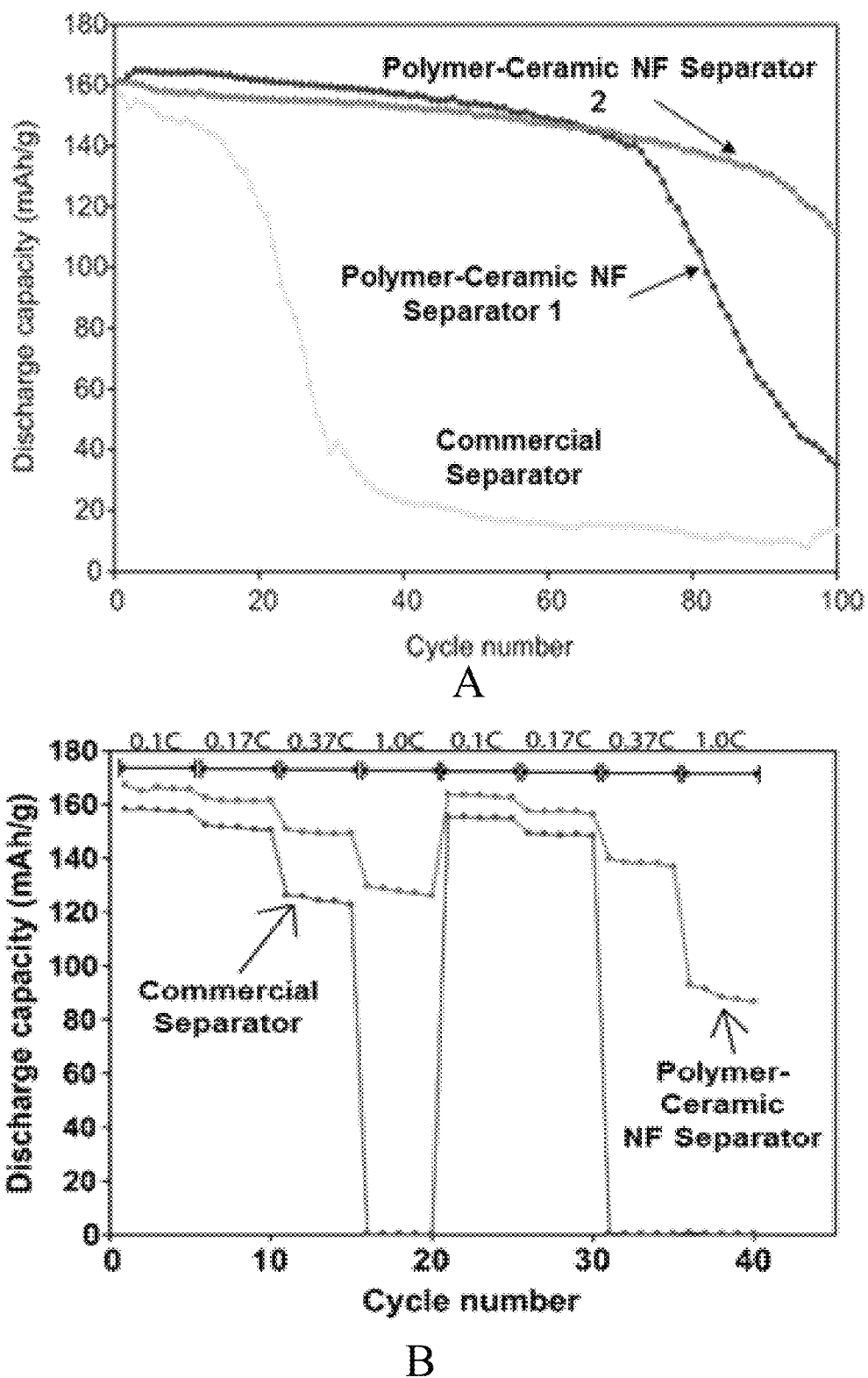
FIG. 4 (panel A) illustrates cycling performance of the capacity of exemplary ceramic/polymer nanofiber separators provided herein.

FIG. 4 (panel A) illustrates cycling performance of the capacity of exemplary ceramic/polymer nanofiber separators provided herein. FIG. 4 (panel B) illustrates rate performance over many cycles. Polymer-Ceramic NF Separators exhibit higher capacity and much better stability over cycles than a commercial polyethylene (PE) separator. In some embodiments, separators provided herein provide discharge capacities after 50 cycles that are at least 50% of the initial discharge capacity when provided in a half-cell with a $LiCoO_2$ cathode (as illustrated in FIG. 4—panel A) (and Li anode). In certain embodiments, separators provided herein provide discharge capacities after 70 cycles that are at least 50% of the initial discharge capacity when provided in such a half-cell. In some embodiments, separators provided herein provide discharge capacities after 50 cycles that are at least 75% of the initial discharge capacity. In certain embodiments, separators provided herein provide discharge capacities after 70 cycles that are at least 75% of the initial discharge capacity. In some embodiments, separators provided herein provide discharge capacities after 50 cycles that are at least 25% of the initial discharge capacity. In certain embodiments, separators provided herein provide discharge capacities after 70 cycles that are at least 25% of the initial discharge capacity. In certain embodiments, separators provided herein provide a discharge capacity of at least 100 mAh/g in a lithium ion half-cell with a $LiCoO_2$ cathode (and Li anode) following the cycle parameters of FIG. 4 (panel B) (i.e., 0.1 C, 0.17 C, 0.37 C, 1.0 C, and repeating)—e.g., on the second 0.37 C cycle. In some embodiments, the discharge capacity under similar conditions is at least 60 mAh/g on the second 1.0 C cycle. In further or alternative embodiments, the discharge capacity is at least 120 mAh/g on the first 1.0 C cycle. In specific embodiments, the discharge capacities are at least as those set forth in FIG. 4 (panel B), or at least 90% thereof (in each cycle).

Figure 5:
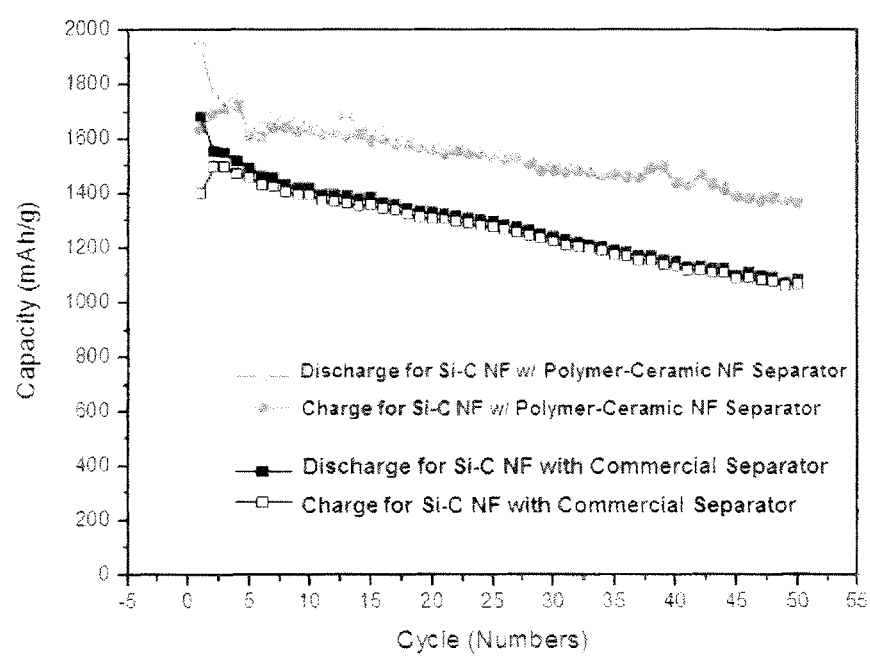
FIG. 5 illustrates that the cycling performance of the capacity of half-cells with the ceramic-polymer NF separator exhibits higher capacity (10 to 20%) and better stability over cycles than that with a commercial PE separator.
Figure 6:
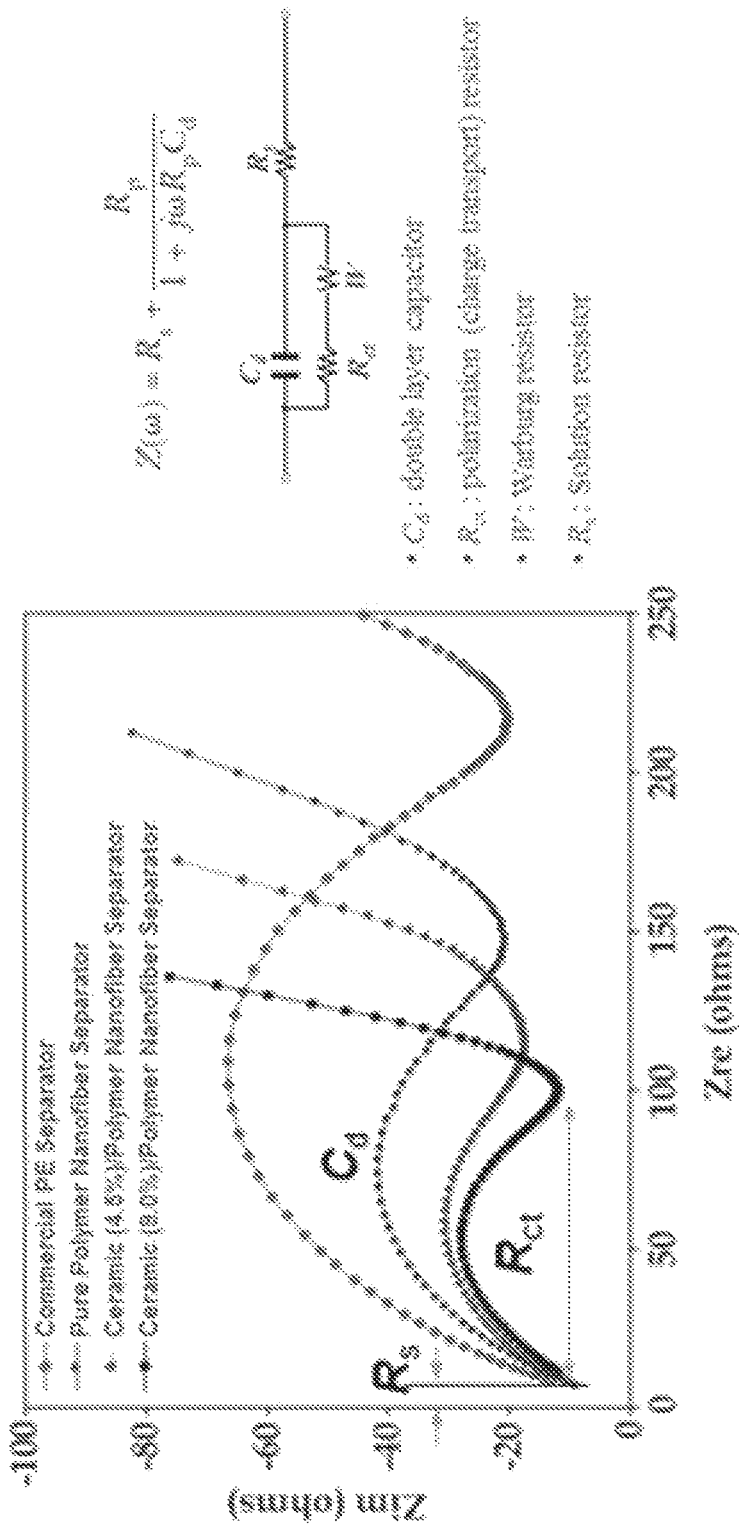
FIG. 6 illustrates that electrochemical impedance spectroscopy (EIS) tests of ceramic-polymer nanofiber separators demonstrate that such separators exhibit much lower charge transport resistance and much higher Li+ diffusion rate than commercial PE separators.

FIG. 5 illustrates that the cycling performance of the capacity of half-cells with the ceramic-polymer NF separator exhibits higher capacity (10 to 20%) and better stability over cycles than that with a commercial PE separator. FIG. 6 illustrates that electrochemical impedance spectroscopy (EIS) tests of ceramic-polymer nanofiber separators demonstrate that such separators exhibit much lower charge transport resistance and much higher Li+ diffusion rate than commercial PE separators. In some embodiments, the transport resistance of a separator described herein is equal to or less than that illustrated in FIG. 6. In certain embodiments, the lithium ion diffusion rate of a separator provided herein is at least as great as that illustrated in FIG. 6.

Process

In certain embodiments, provided herein is a process for preparing ceramic-containing nanofibers. In some embodiments, such ceramic-containing nanofibers (e.g., nanocomposite nanofibers) comprise high amounts of ceramic (e.g., as described herein). Moreover, in some embodiments, provided herein are high quality nanofibers and processes for preparing high quality nanofibers that have good structural integrity, few voids, few structural defects, tunable length, and the like. In certain embodiments, high loading of precursor, relative to polymer loading, in the fluid stock and/or precursor/electrospun nanofibers, facilitates and/or provides such high quality nanofibers. In general, the processes described herein provide the ability to prepare nanostructures with improved performance properties over other nanostructures, such as those prepared by nanowire growth, including deposition, precipitation and growth techniques.

In some embodiments, the electrospun (e.g., as-spun) nanofiber comprising a ceramic material and a polymer is prepared by electrospinning a fluid stock, the fluid stock comprising (1) a ceramic component (e.g., ceramic precursor); and (2) polymer. In specific embodiments, the nanofiber comprises ceramic precursor and polymer. In other specific embodiments, the nanofiber comprises ceramic and polymer.

In some embodiments, provided herein is a process for preparing a ceramic-containing nanofiber (e.g., for use as or in a battery separator, or any other suitable application), the process comprising:

electrospinning a fluid stock, the fluid stock comprising or prepared by combining (i) a ceramic component (e.g., ceramic precursor, ceramic inclusions—such as nano-inclusions, e.g., nanoparticles), to produce a first nanofiber (e.g., electrospun or as-spun nanofiber); and annealing the first nanofiber to produce a ceramic-containing nanofiber.

In specific embodiments, the ceramic component is a ceramic precursor, such as any precursor described herein (e.g., a metal acetate, metal halide, metal diketone, or the like—which in the fluid stock is optionally partially or completely associated with the polymer). In more specific embodiments, the ceramic component is a low temperature curing ceramic precursor (e.g., a polysilazane, such as perhydropolysilazane).

In some embodiments, e.g., if a high temperature calcining or curing ceramic precursor is utilized (e.g., which may result in carbonization and/or removal of the polymer), the process further comprises depositing polymer on the ceramic-containing nanofiber. In specific embodiments, such deposition is achieved in any suitable manner, such as by exposing the ceramic-containing nanofibers to a polymer solution, by electrospraying polymer onto the ceramic-containing nanofibers, or the like. In other embodiments, e.g., wherein a low-temperature curing ceramic precursor is utilized, such a step is not necessary, as the polymer utilized in the electrospinning process need not be removed during curing of the ceramic precursor to ceramic.

In certain embodiments, the ceramic-containing nanofiber is optionally any ceramic-containing nanofiber described herein, e.g., nanofibers comprising a continuous matrix of ceramic, nanofibers comprising a continuous matrix of ceramic and a continuous matrix of polymer, nanofibers comprising an integrated matrix of ceramic and polymer, or the like. In some embodiments, a nanofiber described herein comprises an integrated matrix of ceramic and polymer, the ceramic being a porous (e.g., mesoporous) ceramic matrix comprising polymer positioned within (e.g., within at least a portion of) the porous structures of the ceramic matrix.

In specific embodiments, the fluid stock of any process or composition provided herein comprises an aqueous medium (e.g., water or an aqueous mixture, such as water/alcohol, water/acetic acid, or the like). In other embodiments, the fluid stock comprises an organic solvent (e.g., dimethylformamide (DMF) when the polymer is PAN), or a polymer melt.

In some embodiments, the processes further comprises a treatment step or process (e.g., of the electrospun (e.g., as-spun, or pre-treated, such as with low temperature annealing or washing). In some embodiments, the treatment process comprises (a) thermal treatment; (b) chemical treatment; or (c) a combination thereof. In specific embodiments, treatment of the electrospun (e.g., as-spun) nanofiber comprises thermally treating the electrospun (e.g., as-spun) nanofiber under oxidative conditions (e.g., air)—exemplary chemical treatment. In other specific embodiments, treatment of the as-spun nanofiber comprises thermally treating the as-spun nanofiber under inert conditions (e.g., argon). In still other specific embodiments, treatment of the as-spun nanofiber comprises thermally treating the as-spun nanocomposite nanofiber (e.g., comprising polymer and ceramic component) under reducing conditions (e.g., hydrogen, or a hydrogen/argon blend). In certain embodiments, the as-spun nanofiber is heated to a temperature of about 500° C. to about 2000° C., at least 900° C., at least 1000° C., or the like. In specific embodiments, the as-spun nanofiber is heated to a temperature of about 1000° C. to about 1800° C., or about 1000° C. to about 1700° C. In other embodiments, thermal treatment does not require elevated temperatures. For example, in examples where a low temperature annealing ceramic precursor is utilized, thermal treatment optionally occurs at low temperature (e.g., below 50° C., or room temperature).

In one aspect, the process has a high yield (e.g., which is desirable for embodiments in which the precursor is expensive). In some embodiments, the metal atoms in the nanofiber are about 10%, about 20%, about 30%, about 33%, about 40%, about 50%, about 60%, about 70%, about 80%, about 90%, about 95%, about 98%, or about 100% of the number of (e.g., in moles) metal molecules in the fluid stock.

In some embodiments, the fluid stock is uniform or homogenous. In specific embodiments, the process described herein comprises maintaining fluid stock uniformity or homogeneity. In some embodiments, fluid stock uniformity and/or homogeneity is achieved or maintained by any suitable mechanism, e.g., by agitating, heating, or the like. Methods of agitating include, by way of non-limiting example, mixing, stirring, shaking, sonicating, or otherwise inputting energy to prevent or delay the formation of more than one phase in the fluid stock.

In some embodiments, (e.g., where ceramic precursors are utilized, such as a metal salts, metal complexes, or other metal-ligand associations) the weight ratio of the ceramic component(s) (including one or more ceramic precursors) to polymer is at least 1:3, at least 1:2, at least 1:1, at least 1.25:1, at least 1.5:1, at least 1.75:1, at least 2:1, at least 3:1, or at least 4:1. In certain embodiments, e.g., wherein ceramic nano-inclusions are utilized, the ceramic component to polymer ratio (e.g., in the fluid stock, or a polymer/ceramic nanofiber provided herein) is at least 1:30, at least 1:20, at least 1:10, or the like. In specific embodiments, the ceramic component to polymer ratio is 1:30 to 5:1, e.g., 1:25 to 1:1. Or, more specifically, 1:15 to 1:2. In some embodiments, the monomeric residue (i.e., repeat unit) concentration of the polymer in the fluid stock is at least 100 mM. In specific embodiments, the monomeric residue (i.e., repeat unit) concentration of the polymer in the fluid stock is at least 200 mM. In more specific embodiments, the monomeric residue (i.e., repeat unit) concentration of the polymer in the fluid stock is at least 400 mM. In still more specific embodiments, the monomeric residue (i.e., repeat unit) concentration of the polymer in the fluid stock is at least 500 mM. In some embodiments, the fluid stock comprises at least about 0.5 weight %, at least about 1 weight %, at least about 2 weight %, at least about 5 weight %, at least about 10 weight %, or at least about 20 weight polymer.

In some embodiments, the ceramic precursor comprises a metal salt, metal complex, or any other suitable metal-ligand association. In specific embodiments, the ceramic precursor comprises a silicon precursor, aluminum precursor, zirconium precursor, beryllium precursor, cerium precursor, barium precursor, strontium precursor, titanium precursor, or the like, or a combination thereof. In specific embodiments, ceramic precursors include metal salts or complexes, wherein the metal is associated with any suitable anion or other Lewis Base, e.g., a carboxylate (e.g., —OCOCH$_3$ or another —OCOR group, wherein R is an alkyl, substituted alkyl, aryl, substituted aryl, or the like), an alkoxide (e.g., a methoxide, ethoxide, isopropyl oxide, t-butyl oxide, or the like), a halide (e.g., chloride, bromide, or the like), a diketone (e.g., acetylacetone, hexafluoroacetylacetone, or the like), a nitrates, amines (e.g., NR'$_3$, wherein each R" is independently R or H or two R", taken together form a heterocycle or heteroaryl), and combinations thereof.

In some embodiments, a ceramic inclusion (e.g., nano-inclusion, such as nanoparticle) comprises any suitable ceramic, such as silica, alumina, zirconia, beryllia, ceria, titania, barium titanate, strontium titanate, bentonite, or the like, or combinations thereof.

In some embodiments, a polymer in a process or nanofiber described herein is an organic polymer. In some embodiments, polymers used in the compositions and processes described herein are hydrophilic polymers, including water-soluble polymers. In some aspects, water-soluble polymers include polymers that are dissolvable and swellable in water. Exemplary polymers suitable for the present methods include but are not limited to polyvinyl alcohol ("PVA"), polyvinyl acetate ("PVAc"), polyethylene oxide ("PEO"), polyvinyl ether, polyvinyl pyrrolidone, polyglycolic acid, hydroxyethylcellulose ("HEC"), ethylcellulose, cellulose ethers, polyacrylic acid, polyisocyanate, and the like. In some embodiments, the polymer is isolated from biological material. In some embodiments, the polymer is starch, chitosan, xanthan, agar, guar gum, and the like.

In some embodiments, a polymer described herein (e.g., in a process, precursor nanofiber, a fluid stock, or the like) is a polymer (e.g., homopolymer or copolymer) comprising a plurality of reactive sites. In certain embodiments, the reactive sites are nucleophilic (i.e., a nucleophilic polymer) or electrophilic (i.e., an electrophilic polymer). For example, in some embodiments, a nucleophilic polymer described herein comprises a plurality of alcohol groups (such as polyvinyl alcohol—PVA—or a cellulose), ether groups (such as polyethylene oxide—PEO—or polyvinyl ether—PVE), and/or amine groups (such as polyvinyl pyridine, ((di/mono)alkylamino)alkyl alkacrylate, or the like).

In certain embodiments, the polymer is a nucleophilic polymer (e.g., a polymer comprising alcohol groups, such as PVA). In some embodiments, the polymer is a nucleophilic polymer and a ceramic precursor is an electrophilic precursor (e.g., a metal acetate, metal chloride, or the like). In specific embodiments, the nucleophilic polymer and the ceramic precursor form a precursor-polymer association in the fluid stock and/or the as-spun nanofiber and that association is a reaction product between a nucleophilic polymer and electrophilic precursor(s).

In other embodiments, the polymer is an electrophilic polymer (e.g., a polymer comprising chloride or bromide groups, such as polyvinyl chloride). In some embodiments, the polymer is an electrophilic polymer and a precursor (e.g., ceramic precursor) is a nucleophilic precursor (e.g., metal-ligand complex comprising "ligands" with nucleophilic groups, such as alcohols or amines). In specific embodiments, the nucleophilic polymer and the ceramic precursor form a precursor-polymer association in the fluid stock and/or the as-spun nanofiber and that association is a reaction product (e.g., forming an ionic or covalent bond) between an electrophilic polymer and a nucleophilic precursor.

For the purposes of this disclosure ceramic precursors include both preformed metal-ligand associations (e.g., salts, metal-complexes, or the like) (e.g., reagent precursors, such as metal acetates, metal halides, or the like) and/or metal-polymer associations (e.g., as formed following combination of reagent precursor with polymer in an aqueous fluid).

In other embodiments, sol gel electrospinning may optionally be utilized to prepare ceramic nanofibers described herein. In one exemplary embodiment, sol gel electrospinning techniques include electrospinning (e.g., in a gas assisted manner) a sol fluid stock is electrospun (e.g., coaxially for a coaxially layered ceramic nanofiber). In specific embodiments, sol fluid stocks are prepared by combining an inorganic material suitable for forming a sol (e.g., tetraethyl ortho-silicate (TEOS), triethyl phosphate, titanium isopropanol, etc.) with a solvent (e.g., alcohol, water, isopropanol, acetic acid, or the like, depending on the system) and ripening the combination to form a sol-gel (e.g., by allowing the combination to stand, or by heating the combination—which may accelerate the process).

Electrospinning

In some embodiments, the process comprises electrospinning a fluid stock. Any suitable method for electrospinning is used.

In some instances, elevated temperature electrospinning is utilized. Exemplary methods for comprise methods for electrospinning at elevated temperatures as disclosed in U.S. Pat. Nos. 7,326,043 and 7,901,610, which are incorporated herein for such disclosure. In some embodiments, elevated temperature electrospinning improves the homogeneity of the fluid stock throughout the electrospinning process.

In some embodiments, gas assisted electrospinning is utilized (e.g., about a common axis with the jet electrospun from a fluid stock described herein). Exemplary methods of gas-assisted electrospinning are described in PCT Patent Application PCT/US2011/024894 ("Electrospinning apparatus and nanofibers produced therefrom"), which is incorporated herein for such disclosure. In gas-assisted embodiments, the gas is optionally air or any other suitable gas (such as an inert gas, oxidizing gas, or reducing gas). In some embodiments, gas assistance increases the throughput of the process and/or reduces the diameter of the nanofibers. In some instances, gas assisted electrospinning accelerates and elongates the jet of fluid stock emanating from the electrospinner. In some embodiments, incorporating a gas stream inside a fluid stock produces hollow nanofibers. In some embodiments, the fluid stock is electrospun using any suitable method.

In specific embodiments, the process comprises coaxial electrospinning (electrospinning two or more fluids about a common axis). As described herein, coaxial electrospinning a first fluid stock as described herein (e.g., comprising a ceramic component and a polymer) with a second fluid is used to add coatings, make hollow nanofibers, make nanofibers comprising more than one material, and the like. In various embodiments, the second fluid is either outside (i.e., at least partially surrounding) or inside (e.g., at least partially surrounded by) the first fluid stock. In some embodiments, the second fluid is a gas (gas-assisted electrospinning) In some embodiments, gas assistance increases the throughput of the process, reduces the diameter of the nanofibers, and/or is used to produce hollow nanofibers. In some embodiments, the method for producing nanofibers comprises coaxially electrospinning the first fluid stock and a gas. In other embodiments, the second fluid is a second fluid stock and comprises a polymer and an optional ceramic component (e.g., a ceramic precursor).

The term "alkyl" as used herein, alone or in combination, refers to an optionally substituted straight-chain, or optionally substituted branched-chain saturated or unsaturated hydrocarbon radical. Examples include, but are not limited to methyl, ethyl, propyl, butyl, pentyl, hexyl, and longer alkyl groups, such as heptyl, octyl and the like. certain instances, "alkyl" groups described herein include linear and branched alkyl groups, saturated and unsaturated alkyl groups, and cyclic and acyclic alkyl groups.

The term "aryl" as used herein, alone or in combination, refers to an optionally substituted aromatic hydrocarbon radical of six to about twenty ring carbon atoms, and includes fused and non-fused aryl rings. A non-limiting example of a single ring aryl group includes phenyl; a fused ring aryl group includes naphthyl.

The term "heteroaryl" as used herein, alone or in combination, refers to optionally substituted aromatic monoradicals containing from about five to about twenty skeletal ring atoms, where one or more of the ring atoms is a heteroatom independently selected from among oxygen, nitrogen, sulfur, phosphorous, silicon, selenium and tin but not limited to these atoms and with the proviso that the ring of the group does not contain two adjacent O or S atoms. A non-limiting example of a single ring heteroaryl group includes pyridyl; fused ring heteroaryl groups include benzimidazolyl, quinolinyl, acridinyl.

EXAMPLES

Example 1—Preparing a Fluid Stock of Silicon Acetate and PVA 2 grams of silicon acetate, the metal precursor(s), is dissolved in 20 ml of 1 molar acetic acid solution. The solution is stirred for 2 hours to create a solution of silicon acetate.

In a second solution, 1 gram of 99.7% hydrolyzed polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

The silicon acetate solution is then combined with the PVA solution to create a fluid stock. In order to distribute the precursor substantially evenly in the fluid stock, the precursor solution is added gradually to the polymer solution while being continuously vigorously stirred for 2 hours. The mass ratio of precursor to polymer for the fluid feed (based on initial silicon acetate mass) was 2:1.

Example 2—Preparing a Fluid Stock of Aluminum Acetate and PVA 2 grams of aluminum acetate, the metal precursor(s), is dissolved in 20 ml of 1 molar acetic acid solution. The solution is stirred for 2 hours to create a solution of aluminum acetate.

In a second solution, 1 gram of 99.7% hydrolyzed polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

The aluminum acetate solution is then combined with the PVA solution to create a fluid stock. In order to distribute the precursor substantially evenly in the fluid stock, the precursor solution is added gradually to the polymer solution while being continuously vigorously stirred for 2 hours. The mass ratio of precursor to polymer for the fluid feed (based on initial aluminum acetate mass) was 2:1.

Example 3—Preparing Silica Nanofiber

A fluid stock of Example 1 is electrospun in a co-axial manner using a nozzle/spinneret similar to the one depicted in FIG. 1 (where 111 illustrates the nozzle/spinneret). The center conduit contains silicon acetate fluid stock of Example 1 and the outer conduit contains a gas stream (high velocity/pressurized air)—gas assisted electrospinning. The outer tube depicted in FIG. 1 is absent. The electrospun nanofiber is calcinated by heating for 2 hours at 600° C. in an atmosphere of air.

Example 4—Preparing Alumina Nanofiber

A fluid stock of Example 2 is electrospun in a co-axial manner using a nozzle/spinneret similar to the one depicted in FIG. 1 (where 111 illustrates the nozzle/spinneret). The center conduit contains aluminum acetate fluid stock of Example 2 and the outer conduit contains a gas stream (high velocity/pressurized air)—gas assisted electrospinning. The outer tube depicted in FIG. 1 is absent. The electrospun nanofiber is calcinated by heating for 2 hours at 600° C. in an atmosphere of air.

Example 5—Preparing Silica/Alumina Nanocomposite Nanofiber

Two fluid stocks are electrospun in a co-axial manner using a spinneret similar to the one depicted in FIG. 1 (where 111 illustrates the nozzle/spinneret). The center conduit contains aluminum acetate fluid stock of Example 2 and the outer conduit contains silicon acetate fluid stock of Example 1. The electrospinning procedure is optionally gas-assisted, e.g., by flowing high velocity gas through the outer tube depicted in FIG. 1. The electrospun hybrid fluid stock is calcinated by heating for 2 hours at 600° C. in an atmosphere of air.

Example 6—Preparing a Fluid Stock of Zirconium Acetate and PVA 2 grams of zirconium acetate, the metal precursor, is dissolved in 20 ml of 1 molar acetic acid solution. The solution is stirred for 2 hours to create a solution of aluminum acetate.

In a second solution, 1 gram of 99.7% hydrolyzed polyvinyl alcohol (PVA) with an average molecular weight of 79 kDa and polydispersity index of 1.5 is dissolved in 10 ml of de-ionized water. The polymer solution is heated to a temperature of 95° C. and stirred for 2 hours to create a homogenous solution.

Figure 2:
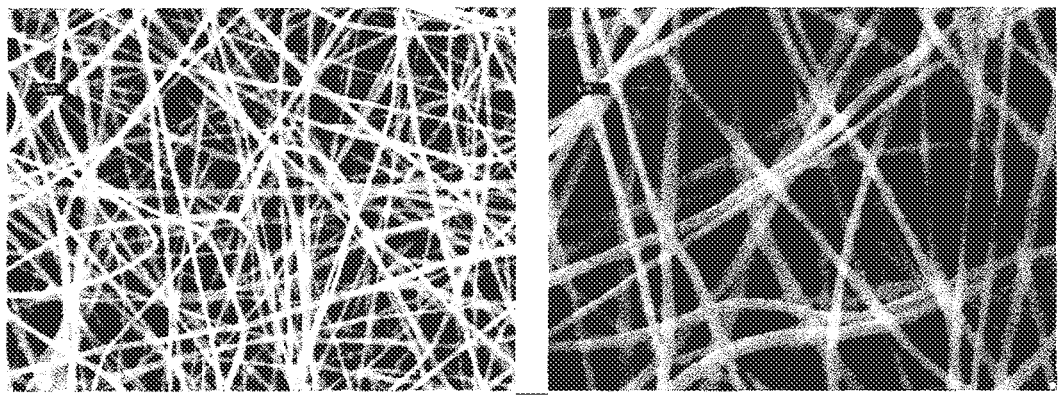
FIG. 2 illustrates SEM images of ceramic-containing nanofibers obtained by (i) electrospinning a fluid stock prepared by combining polymer and ceramic precursor, and (ii) annealing/calcining the electrospun nanofiber (e.g., to carbonize and remove the polymer and convert the ceramic precursor to ceramic).

The zirconium acetate solution is then combined with the PVA solution to create a fluid stock. In order to distribute the precursor substantially evenly in the fluid stock, the precursor solution is added gradually to the polymer solution while being continuously vigorously stirred for 2 hours. The mass ratio of precursor to polymer for the fluid feed (based on initial zirconium acetate mass) was 2:1. FIG. 2 illustrates an x-ray diffraction plot of $ZrO_2$ nanofibers from electrospinning of Zr—Ac/PVA (2:1) solution.

Example 7—Preparing Zirconia Nanofiber

A fluid stock of Example 6 is electrospun in a co-axial manner using a nozzle/spinneret similar to the one depicted in FIG. 1 (where 111 illustrates the nozzle/spinneret). The center conduit contains zirconium acetate fluid stock of Example 2 and the outer conduit contains a gas stream (high velocity/pressurized air)—gas assisted electrospinning. The outer tube depicted in FIG. 1 is absent. The electrospun nanofiber is calcinated by heating for 2 hours at 800° C. in an atmosphere of air. FIG. 2 illustrates zirconium precursor nanofibers (left) having average diameters of 800-1000 nm, and zirconia nanofibers (right), having average diameters of 300-600 nm.

Example 8—Preparing Silica/Zirconium Nanocomposite Nanofiber

Two fluid stocks are electrospun in a co-axial manner using a process similar to that described in Example 5. The center conduit contains zirconium acetate fluid stock of Example 6 and the outer conduit contains silicon acetate fluid stock of Example 1. The electrospinning procedure is optionally gas-assisted, e.g., by flowing high velocity gas through the outer tube depicted in FIG. 1. The electrospun hybrid fluid stock is calcinated by heating for 2 hours at 600° C. in an atmosphere of air.

Example 9—Ceramic Inclusions

Figure 3:
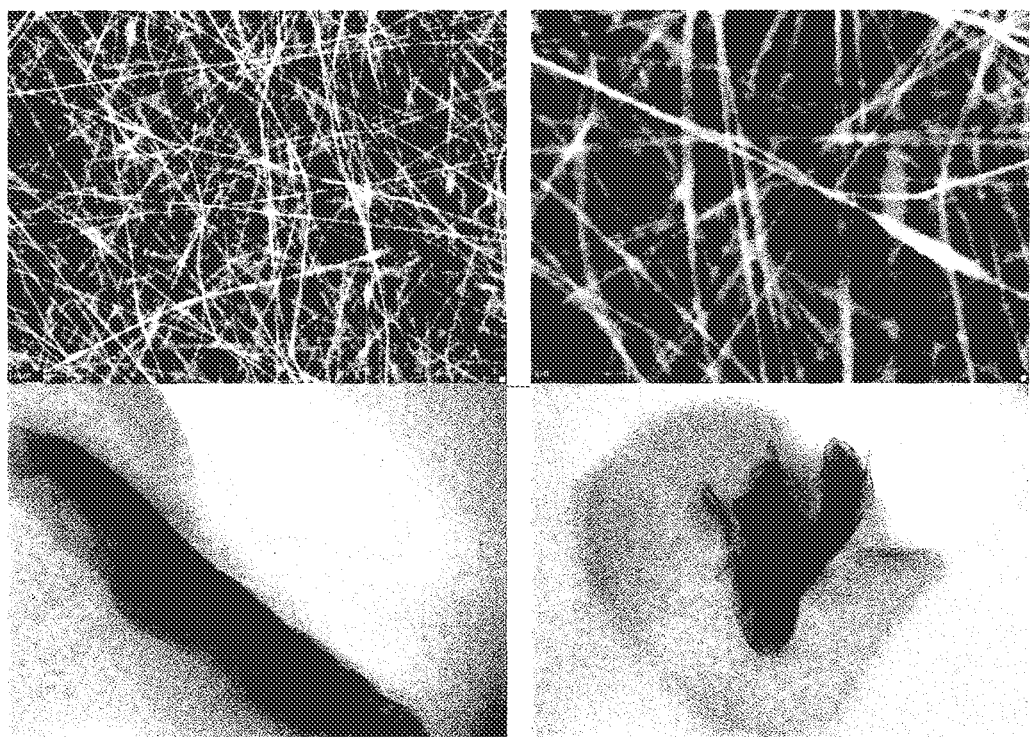
FIG. 3 illustrates SEM (top) and TEM (bottom) images of the nanofibers comprising a polymer matrix with ceramic inclusions.

Ceramic inclusion (bentonite) is dispersed with polyacrylonitrile (PAN) in DMF, in a ceramic to polymer ratio of 9:91. Using a gas assisted electrospinning process, such as described in Example 3, a nanofiber mat comprising nanofibers with a polymer (PAN) matrix and ceramic inclusions embedded therein is prepared (having a ceramic-to-polymer ratio of 9:91). FIG. 3 illustrates SEM (top) and TEM (bottom) images of the nanofibers.

Similar nanofibers are prepared using various amounts of ceramic, e.g., wherein nanofibers comprise 4.5 wt. % ceramic (e.g., 95.5 wt. % polymer) and 9.5 wt. % ceramic (e.g., 90.5 wt. % polymer).

Example 10—Capacity of Separator Comprising Nanofibers with PAN Matrix and Ceramic Inclusions Half-cell tests of ceramic-polymer nanofiber separators with a Li-ion cathode ($LiCoO_2$). Polymer-Ceramic NF Separators 1 and 2 contain 4.5 and 9.5 wt. % of bentonite (as described in Example 9). FIG. 4 (panel A) illustrates cycling performance of the capacity. FIG. 4 (panel B) illustrates rate performance over many cycles. Polymer-Ceramic NF Separators exhibit higher capacity and much better stability over cycles than a commercial polyethylene (PE) separator.

Further, half-cell tests of ceramic-polymer nanofiber separators with a Si—C nanofiber Li-ion anode. FIG. 5 illustrates that the cycling performance of the capacity of half-cells with the ceramic-polymer NF separator exhibits higher capacity (10 to 20%) and better stability over cycles than that with a commercial PE separator.

Finally, FIG. 6 illustrates that electrochemical impedance spectroscopy (EIS) tests of ceramic-polymer nanofiber separators demonstrate that such separators exhibit much lower charge transport resistance and much higher Li+ diffusion rate than commercial PE separators.

Example 11—Polysilazane

Figure 7:
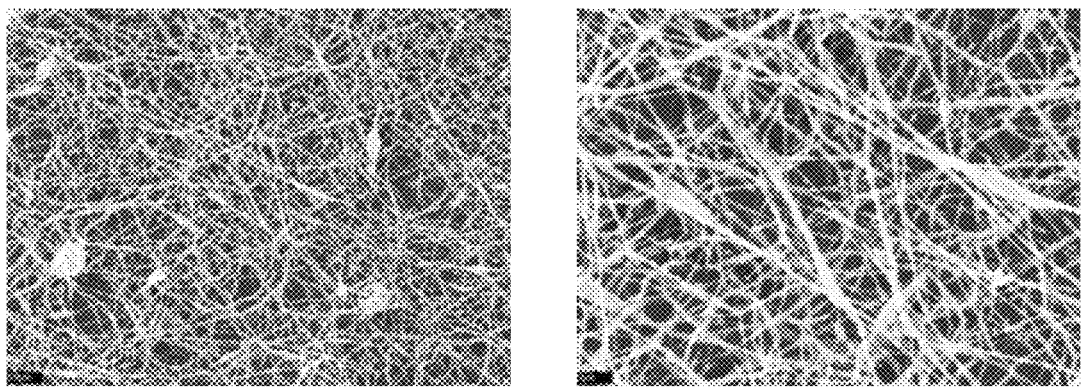
FIG. 7 illustrates SEM images of nanofibers having an integrated polymer/ceramic (silica/PEO) matrix.

Perhydropolysilazane, polyethyelene oxide (PEO)—MW=100,000, and dibutyl ether are combined in a PEO:PHPS ratio of 2:1. Using a gas assisted electrospinning process, such as described in Example 3, a nanofiber mat, which is cured at room temperature to provide hybrid nanofibers comprising an integrated matrix of PEO and silica. FIG. 7 illustrates SEM images of the silica/PEO nanofibers.

Figure 8:
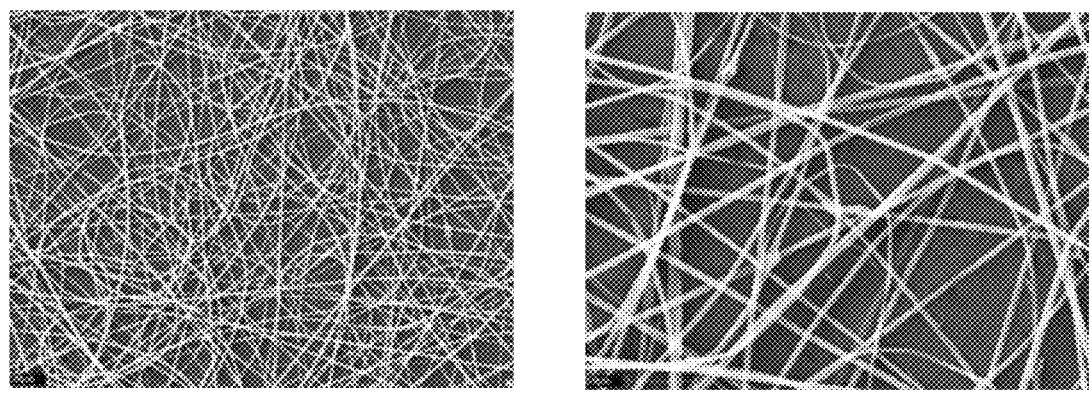
FIG. 8 illustrates SEM images of silica/PEO nanofibers.
Figure 9:
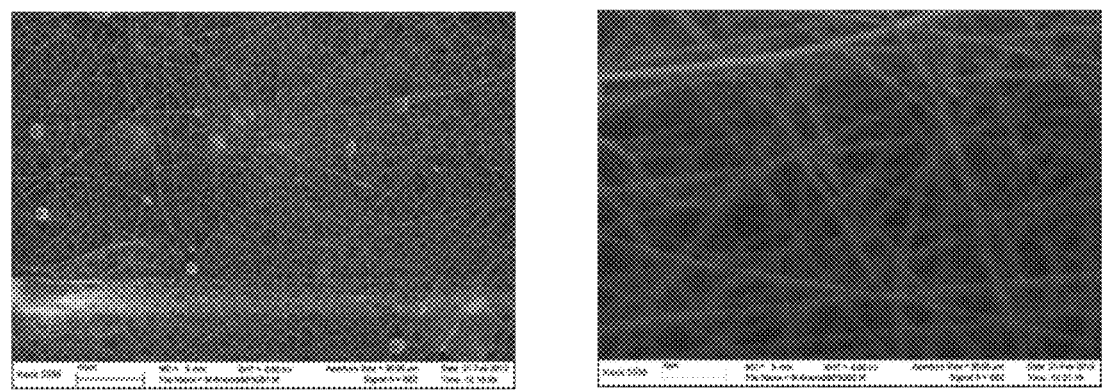
FIG. 9 illustrates SEM images of silica/m-aramid nanofibers.

Similar nanofibers were also prepared using higher molecular weight PEO (MW=600,000). FIG. 8 illustrates SEM images of such silica/PEO nanofibers. Similarly, other polymers were used in similar processes, such as m-aramid. FIG. 9 illustrates SEM images of such silica/m-aramid nanofibers.

What is claimed is:

1. A battery separator comprising
a nanofiber mat, the nanofiber mat comprising at least one nanofiber, the at least one nanofiber comprising a continuous matrix material being continuous along at least 10% of the length of the nanofiber, and a plurality of discrete domains within the nanofiber, wherein the continuous matrix material comprises at least one ceramic material, a polymer, a ceramic material and a polymer, or an integrated material of ceramic and polymer, wherein the discrete domains are non-aggregated and are dispersed in a substantially uniform manner, along the length of the nanofiber, and wherein the continuous matrix material, the discrete domains, or both the continuous matrix material and the discrete domains comprise at least one ceramic material.

2. The battery separator of claim 1, wherein the separator comprises at least one ceramic material and at least one polymer material.

3. The battery separator of claim 1, wherein the nanofiber is a nanocomposite nanofiber, comprising at least two materials.

4. The battery separator of claim 3, wherein the nanocomposite nanofiber comprises at least two ceramic materials.

5. The battery separator of claim 3, wherein the at least two materials are coaxially layered, and wherein at least one layer of the at least two materials comprises at least one ceramic material, and wherein the at least one ceramic material forms non-aggregated, discrete domains of ceramic material.

6. The battery separator of claim 3, wherein the nanocomposite nanofiber comprises at least one ceramic material and at least one polymer material.

7. The battery separator of claim 6, wherein the at least one ceramic material and at least one polymer material form an integrated nanofiber matrix.

8. The battery separator of claim 3, wherein the nanocomposite nanofiber comprises a first ceramic material as a core material and a second ceramic material as a sheath material, the sheath material at least partially surrounding the core material.

9. The battery separator of claim 1, wherein the one or more ceramic materials are independently selected from the group consisting of silica, alumina, zirconia, beryllia, ceria, titania, barium titanate, and strontium titanate.

10. The battery separator of claim 1, wherein the polymer material is selected from PAN, polyalkeneoxide, polyalkylene, polyvinylalcohol (PVA), or a polyacrylate.

11. The battery separator of claim 1, wherein the at least one nanofiber comprises a mesoporous ceramic matrix.

12. The battery separator of claim 1, wherein the porosity of the nanofiber mat is at least 10%.

13. The battery separator of claim 1, wherein the nanofiber mat comprises at least 50% by weight of ceramic material.

14. The battery separator of claim 1, wherein the at least one nanofiber has an average diameter of less than 1 micron.

15. The battery separator of claim 1, wherein the at least one nanofiber has an average aspect ratio of at least 100.

16. A battery comprising the battery separator of claim 1, wherein the battery is a lithium ion battery.

17. The battery separator of claim 1, wherein the discrete domains comprise a ceramic.

18. The battery separator of claim 1, wherein the porosity of the nanofiber mat is greater than 50%.

19. The battery separator of claim 1, wherein the porosity of the nanofiber mat is at least 55%.

20. The battery separator of claim 1, wherein the nanofiber is substantially flexible or non-brittle.

* * * * *